United States Patent [19]

Hauser

[11] Patent Number: 4,878,390
[45] Date of Patent: Nov. 7, 1989

[54] LINEAR POSITIONING APPARATUS

[75] Inventor: Karlheinz Hauser, Steinenbronn, Fed. Rep. of Germany

[73] Assignee: Neff Gewindespindeln GmbH, Waldenbuch, Fed. Rep. of Germany

[21] Appl. No.: 298,633

[22] Filed: Jan. 18, 1989

[30] Foreign Application Priority Data

Feb. 11, 1988 [DE] Fed. Rep. of Germany ....... 3804117

[51] Int. Cl.[4] ............................................. F16H 1/18
[52] U.S. Cl. ............................... 74/89.15; 74/424.8 R
[58] Field of Search ......................... 74/89.15, 424.8 R

[56] References Cited

U.S. PATENT DOCUMENTS 2,885,920  5/1959  Livingston .
3,109,335  11/1963 Gerchow .
4,483,523  11/1984 Bredow .
4,512,208  4/1985  Lipinski et al. ..................... 74/89.15
4,566,738  1/1986  Fasth .
4,604,027  8/1986  Becker et al. .................. 74/89.15 X

FOREIGN PATENT DOCUMENTS 0106826  4/1984  European Pat. Off. .
2106821  4/1983  United Kingdom .

Primary Examiner—Philip C. Kannan
Attorney, Agent, or Firm—Frishauf, Holtz, Goodman & Woodward

[57] ABSTRACT

To support a long spindle with a spindle nut thereon, a plurality of support elements are located in a housing (1), the support elements (26, 226) including spring-biassed sliders which, when positioned at predetermined stop recesses (48) in the inside of the housing (1) engage the stop recesses. Upon movement of the spindle against a support element (26, 226), the spring-biased sliders are pushed out of the recesses and the lifting movement of the sliders engages a projecting connecting dog (44, 53) in the groove of a take-up carrier rail, the groove being closed off at the end. As the spindle nut (5) moves, support elements (26) are pushed ahead of the leading face thereof, with respect to the movement of the spindle nut, and collected. Upon reversal of movement of the spindle (4), the end stop (51) of the take-up carrier rails pulls the support elements (26, 226) along until a support element snaps into a stop recess (48), thus releasing the connecting dog (44, 53) from the groove (50) in the rail, and permitting the end stop (51) of the carrier rail to pass over the connecting dog, thereby positioning the respective support element at the location of the stop recess.

19 Claims, 8 Drawing Sheets

LINEAR POSITIONING APPARATUS

Reference to related patent, the disclosure of which is hereby incorporated by reference: U.S.Pat. No. 4,512,208, (to which German Pat. No. DE-PS 32 05 143 coresponds).

The present invention relates to a linear positioning apparatus, and more particularly to a linear positioning apparatus having a longitudinally extending element, such as a spindle, which, by means of a spindle nut, moves a positioning element longitudinally of the spindle.

BACKGROUND

Longitudinal positioning apparatus use elongated elements, such as piston rods, spindles and the like, to move a positioning element. If the positioning element is driven by a spindle, the positioning element is coupled to a spindle nut which is located in a housing or a frame structure, to be non-rotatable with respect to the housing or frame, but longitudinally slidable thereon. The positioning element itself is coupled to the spindle nut.

Spindles which are very long should be supported along their length to prevent oscillations, bend-through, and the like. German Pat. No. 32 05 143 describes a linear positioning apparatus in which a spindle is located in a tubular, essentially rigid housing formed with a longitudinal slit. The housing retains bearing elements at both ends thereof, the spindle extending therethrough, and being coupled at one end to a drive motor. The positioning element itself extends through the slit in the housing, and is coupled to a spindle nut.

The linear positioning apparatus permits longitudinal movement of machine elements coupled to the positioning element and precisely positioning the machine element with respect to the housing, or a predetermined reference, by driving the spindle. The positioning speed, likewise, is readily controllable. The axial length of the spindle, in relation to its diameter, and in further relation to the maximum speed of the spindle, does not require radial support of the spindle intermediate the bearing ends at the end of the housing if the speed, diameter and length are matched and are below predetermined limits. If the spindle is extra long, or thin, however, or the speed increased, additional apparatus or devices are required in order to radially support the spindle in the region between the bearings at the ends of the housing and the spindle nut.

Radial support of spindles which are thin or are operated at high speed, and are of substantial length, is necessary to prevent bend-through of the spindle and, when driven, to prevent orbital movement about the longitudinal axis of the housing. Such movements, which may also be in the form of oscillations or vibrations, excessively stress the spindle, the spindle nut, the bearings, and, if excessive, may lead to damage of the housing itself. The length of the free regions of the spindle changes as the spindle nut changes its position with respect to the ends or another reference position of the housing. This requires that radial support elements must travel together with travel of the spindle nut in order to prevent interference with longitudinal movement of the spindle nut as the spindle is being driven.

Some structures used in actual arrangements use essentially ring-shaped support elements, threaded about the spindle, which are longitudinally guided and supported on the inner wall of the housing. Coupling elements are provided which permit the spindle nut to carry along the support elements during movement of the spindle nut. These coupling elements are longitudinally extending steel strips which connect the coupling elements with the spindle. The steel strips have dirrerent lengths for the respective support elements. The steel strips are slidable on the spindle nut. As the spindle nut travels in one direction, the leading side of the spindle nut collects the support elements at the front side thereof, and pushes the support elements along. At the same time, support elements at the trailing side—with respect to movement of the spindle nut —are likewise carried along. The support elements at the trailing side, however, will remain in the housing as the steel strips are being played out from the spindle nut, so that the spindle, in the distances determined by the length of the steel strips, will be radially supported. If the direction of movement of the spindle nut is then reversed, the previously leading support elements now become the support elements at the trailing side, and the process will reverse, with the previously trailing support elements being collected in front of the spindle, and the previously leading spindle nuts now trailing and being paid out in accordance with the length of the steel strips connecting the support elements to the spindle nut.

Two connecting strips are provided for each support element. The number of support elements, thus, is limited by the size of the apparatus and the space available to accomodate the steel strips. The maximum spacing of the support elements is determined by the length of the steel strips. Further, it may occur that upon longer travels of the spindle nut, the support elements will follow the spindle nut with spacing determined by the respective lengths of the steel strips. Consequently, in particularly long spindles, the space between the last support element, that is, the one that has the longest steel strips associated therewith, and the associated bearing flange may becone undesirably long, leaving a long non-supported region of the spindle.

The arrangement has an additional disadvantage, namely that the drive is preferentially useful only for essentially horizontal drive; if installed vertically, the support elements at the upper side of the spindle nut, whether leading or trailing, will always fall against the end face of the spindle nut, that is, they will fall downwardly.frictional retenion is undesirable since unreliable and subject to excessive wear and tear or contamination.

The Invention

It is an object to provide a mechanical linear positioning apparatus with a longitudinally supported spindle which is independent of the position of the spindle with respect to gravity, reliable, and in which the spindle is radially supported on as many support points as desirable, freely selectable in accordance with design requirements, and essentially without constraint on the available space within a spindle housing or frame structure.

Briefly, the support elements include a body portion and a movable, resiliently biased engagement element which can project from the body portion. The body portion surrounds the spindle. The overall support for the spindle, for example a slit tube, frame structure or the like, is formed with at least one, and preferably a plurality of recesses which are positioned along the length of the spindle for engagement by the projectable engagement element, to provide fixed support points along the length of the spindle. The projectable elements are resiliently releasable from engagement with the recesses by engagement with the leading end portion of the spindle upon axial movement thereof against the support element. The spindle nut has take-up carriers located on both end portions engageable with the support elements and arranged to permit release of the support elements therefrom, to carry along support elements at the trailing side, with respect to spindle movement, and push along support elements at the leading side of the spindle nut. The support elements further include movable connecting dogs, for example in the form of projections or the like, engageable with the take-up carrier upon release of the projectable engagement element from the respective recess in the support or housing, and to disengage from the take-up carrier when the projectable engagement element is engaged in a recess.

The recess in the housing forms, essentially, a stop for the support elements; other stops than recesses may be used, for example projecting buttons which, then, engage in a matching cavity formed in the projectable element. The connecting dog and the projectable element may be formed as one structure; if, for example, the projectable element, under resilient spring pressure, snaps into a recess in the housing, the radial movement thereof at the same time releases the connecting dog, which can be formed at the other end of the projectable element, from the take-up carrier.

The arrangement, thus, provides for axial movement of the support elements by the connecting dog upon engagement with the take-up carrier, so that the support elements are moved with the spindle nut, axially, by being pushed along the leading edge thereof, while, at the trailing edge, the support elements will be positioned along the length of the support wherever the stop means are located which, in one conjoint movement, provide for engagement with the respective projectable element and release of the connecting dog from the take-up carrier.

The arrangement has the advantage that the stops can be distributed along the length of the support for the spindle, as desired, and in accordance with design requirements; thus, the stops can be predetermined along a housing, and the spacing matched to the design parameters of the spindle drive, that is, its length, spindle diameter, operating speed and the like.

Upon longitudinal movement of the spindle nut, the nut leaves a support element at each one of the stops, typically recesses, so that the support element will be locally snap-in engaged and form a support for the spindle; at the same time, those support elements which are on the leading side of the spindle nut are automatically released, by the resilient interengagement of the projectable element and the recess, from the fixed position and simultaneously collected by the take-up carrier. The support elements are not permanently connected to the spindle nut. Thus, the support elements can remain in their respective axial position, assigned to them by the distribution of the stops or recesses in the housing or support. This permits constructing the housing or support with any desired length and to support the spindle along the length as necessary and desired. The support elements themselves can be simply and compactly constructed, and do not require any extensive or expensive changes on the spindle nut. The geometric position of the entire apparatus can be randomly selected, for example vertically, at a slant, or horizontally, as necessary. Retrofitting of existing spindle drives in accordance with the inventive concept is readily possible.

The apparatus permits supporting spindles in which the spindle nut is used in longitudinal positioning apparatus surrounded by an essentially tubular housing. The apparatus is, however, also applicable to other spindle drives which do not have tubular housings. It is only necessary to provide an elongated structure extending along the spindle and providing guide tracks parallel to the spindle for the movable element thereof and positioning structures for the support element, which permit guidance of the support elements longitudinally ahead of, and behind the spindle, without rotation with respect to the spindle nut, and which permit radial support of the support elements themselves, and hence of the spindle. Longitudinal, open frames thus are entirely suitable. The term "linear positioning apparatus" thus is intended to mean any type of linear drive arrangement which has a elongated operating element, typically a spindle, which has associated therewith a fixed displacement guide path or guide track or guide rail structure capable of supporting the movable support elements where desired.

Drawings, illustrating two basic embodiments:

DETAILED DESCRIPTION

Figure 1:
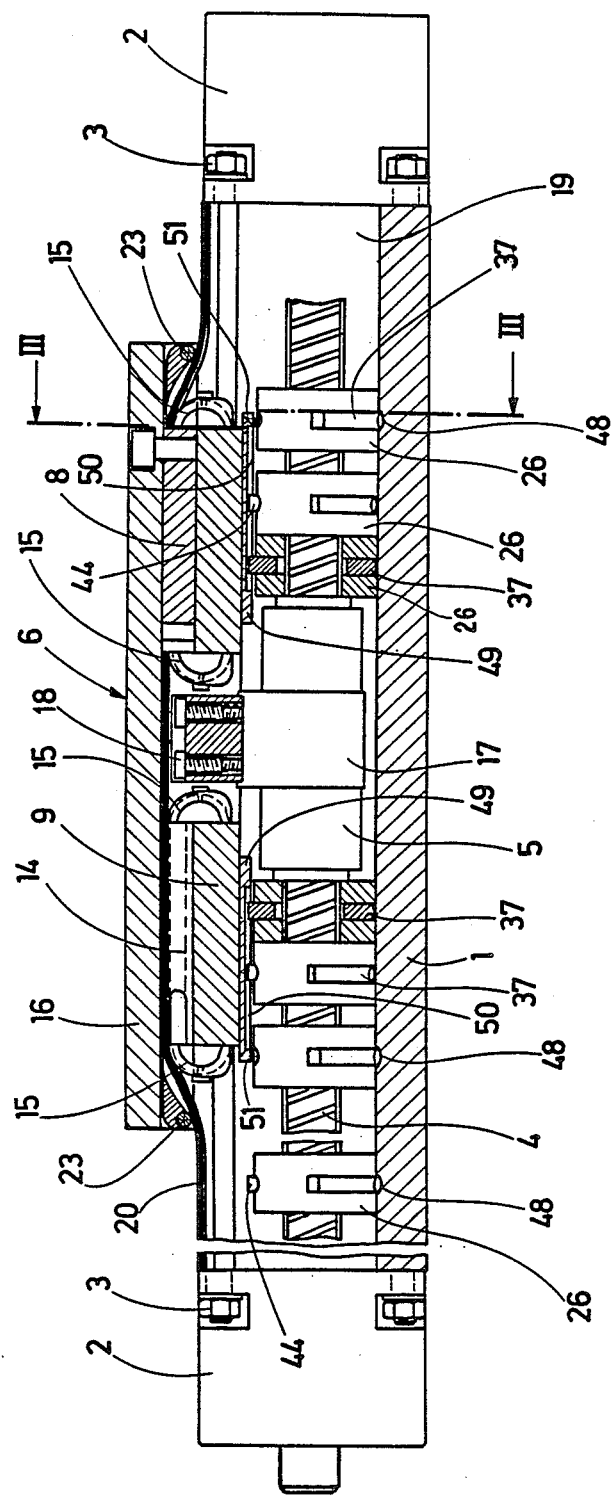
FIG. 1 is a schematic longitudinal, part-sectional view of a support element in longitudinally locked position.
Figure 2:
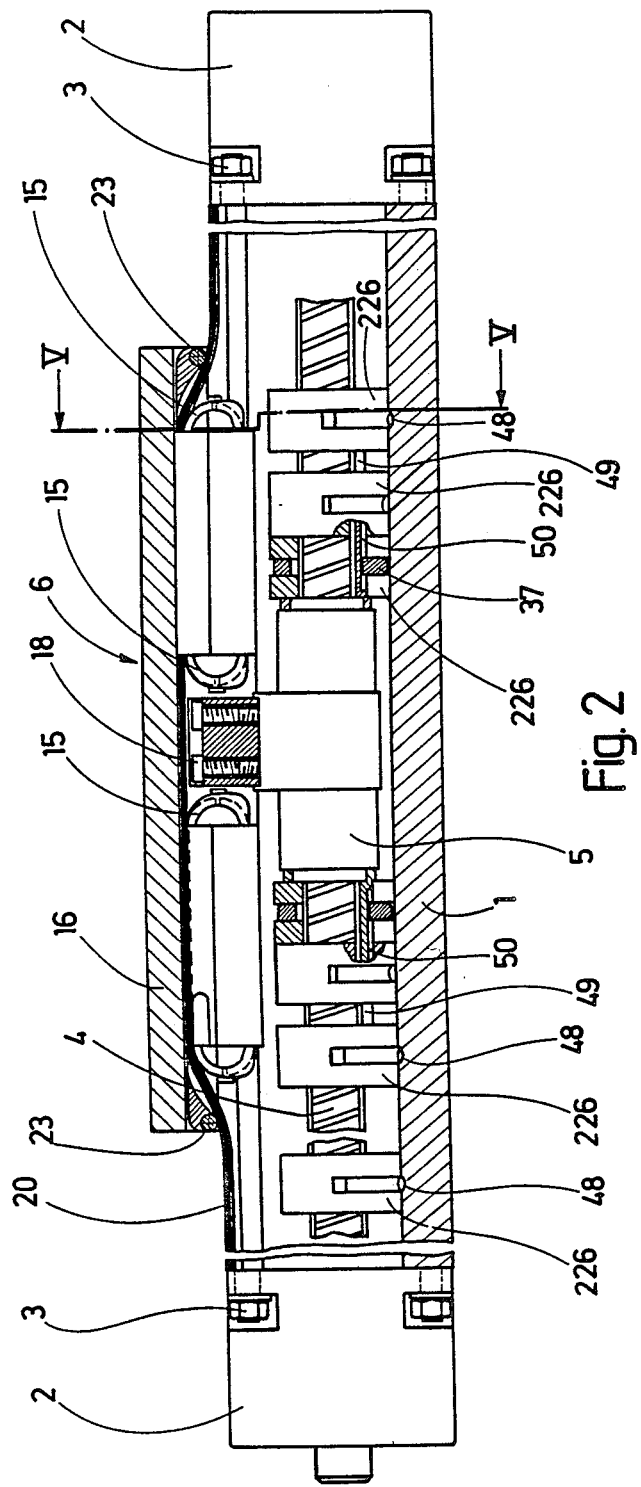
FIG. 2 is a schematic longitudinal part-sectional view of another embodiment of a support element in longitudinally locked position.

The linear positioning apparatus shown in FIGS. 1 and 2 has a longitudinal frame or housing 1, which is elongated and rigid. As shown, a tubular structure is used, made of lightweight metal, having a cross section best seen, for example, in FIG. 3. The housing 1 is made of two shell elements, and cut off at its two ends by end flanges 2, fitted against the facing ends of the housing 1 and connected thereto by bolts 3. The end flanges 2 form also bearing supports for suitable slide, needle or roller bearings for a spindle 4. The bearings have been omitted for purposes of clarity of the drawing, and may be of any well known and suitable construction. The spindle 4 is rotatable in the bearings, and has a projecting stub, adapted to be driven by a suitable motor, for example coupled to the respective flange from which the spindle projects.

Figure 3:
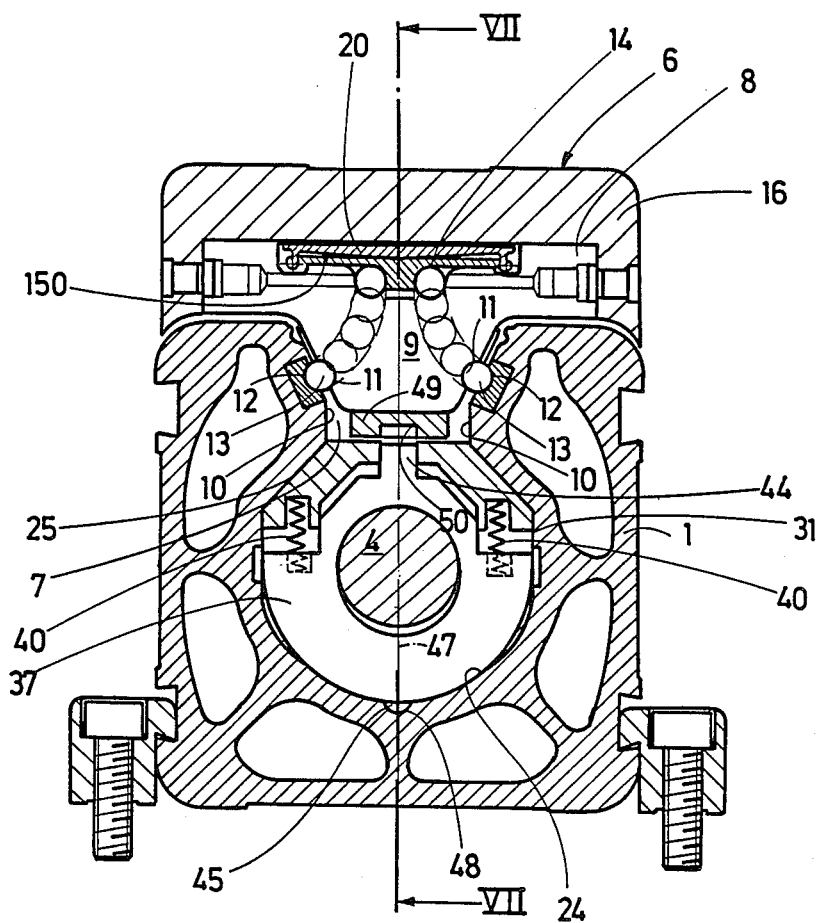
FIG. 3 is a cross section along line III—III of FIG. 1

A spindle nut 5 is seated on the spindle 4, which, in combination with the spindle, forms a longitudinal spindle drive. The spindle nut 5 is coupled to a longitudinally slidably guided force transfer element 6, engaged with the spindle nut and projecting through a longitudinal slit 7 of the housing 1, coupled to the spindle nut for example by suitable connecting screws. The force transfer element 6 has two runner-like elements 8 of essentially T-shaped cross section, to form a slider or slide carriage, and including linear bearings. The elements 8 have a connecting path 9 which, in cross section, is generally trapezoidal, extending through the longitudinal slit 7. The side walls of the trapezoidal part 9 extend roughly parallel to the adjacent walls 10 of the housing 1 and carry longitudinally extending ball bearing tracks 11, which permit longitudinal balls of longitudinal bearing to operate therein, and associated with each one of the housing walls 10. The ball races or tracks 12 are bearing strips made of hardened, ground steel, and fitted in respective grooves of the housing walls 10. As best seen in FIGS. 1 and 3, two ball return ducts 14 are formed in the slider elements 8, positioned above the races 12, and covered at the top by an upwardly placed cover and guide portion 150. The portion 150 is fitted in a recess of the element 8 and includes the ball return ducts 14.

Two ball deflection of ball end elements 15 (FIG. 1) are located at respectively opposite sides of the ball return ducts 14 and secured to the carriage element 8. The end elements 15 have U-shaped ball deflection ducts formed therein which couple the respective ball return duct or channel 14 with the associated ball race 11, 12.

A row of balls 13 (FIG. 3) is inserted in each one of the races 11, 12. The unloaded balls are recirculated through the ball deflecdtion ducts or channels 14, as well known in linear bearings. By the groove-like shape of the races 11, 12 and by suitable shaping of the support structures and relative positioning, it is readily possible and apparent that the force transfer element is longitudinally slidable, but non-removably retained on the housing 1 by the rows of balls 13 in the respective races.

Two slider elements 8 are securely connected together, axially spaced from each other. A solid cover plate 16 is screw-connected to the elements 8. The cover plate 16 is, in cross section, generally U-shaped, and fitted on top of the carriage elements 8. At the side opposite the cover plate 16, a coupling element 17 (FIG. 1) which, in cross section, is essentially T-shaped, is connected by bolts 18 to the spindle nut 5. The coupling element 17 is located in the interior 19 of the housing 1 and couples the force transfer element 6 to the spindle nut 5.

Figure 4:
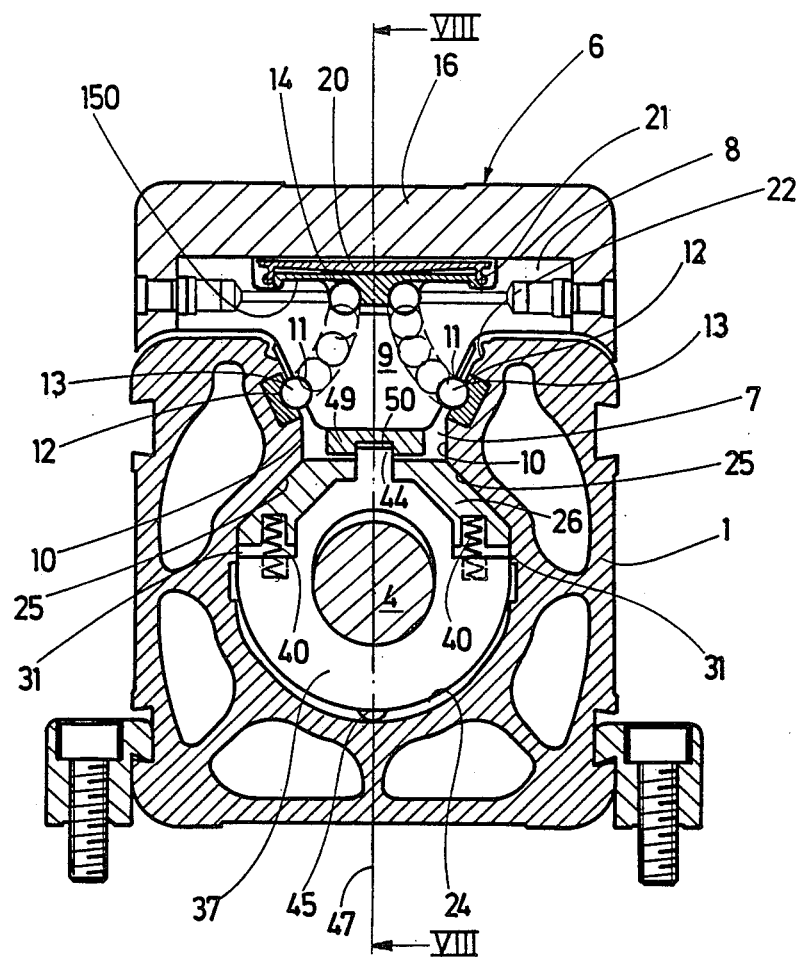
FIG. 4 is a view similar to FIG. 3, illustrating the support element in released position, and coupled to a take-up carrier on the spindle nut.

The longitudinal slit 7 is colosed off at both sides to the force transfer element 6 by an elastic cover strip or ribbon 20. Ribbon 20 has laterally formed holding flanges 21 (FIG. 4) which engage in longitudinal groove-like recesses 22 of the housing wall portions 10, located adjacent the longitudinal slit 7, to be releasably retained therein. The cover strip 20 is carried beneath the cover plate 16 of the carriage, as best seen in FIGS. 1, 3 and 4. Strip or tape guide rollers 23, located on extensions of the cover plate 16 close to the ends thereof, press the upper side of the cover strip 20 into the longitudinal slit 7 upon longitudinal movement of the force transfer element 6 with respect to the housing 1, so that the slit on the respective sides of the force transfer element 6 is always securely covered to prevent contamination.

The interior 19 of the housing 1, as best seen in FIGS. 3 and 4, has approximately semi-cylindrical shape at the lower portion thereof. the upper portion or upper half is formed by two flat surfaces 25 merging with the essentially semi-cylindrical surfaces 24, or connected thereto by short straight portions. The surfaces 25 are inclined towards each other and form, between each other, an angle of, preferably, about 90°, that is, they are inclined, each, at about 45° with respect to a longitudinal axis or plane 47 (FIG. 4) of the housing and of the spindle.

To support the spindle, a plurality of support elements 26 are located in the interior 19 of the housing 1, at both sides of spindle nut 5, and surrounding the spindle 4. The support elements, preferably, are made of plastic material and essentially ring-shaped.

Figure 11:
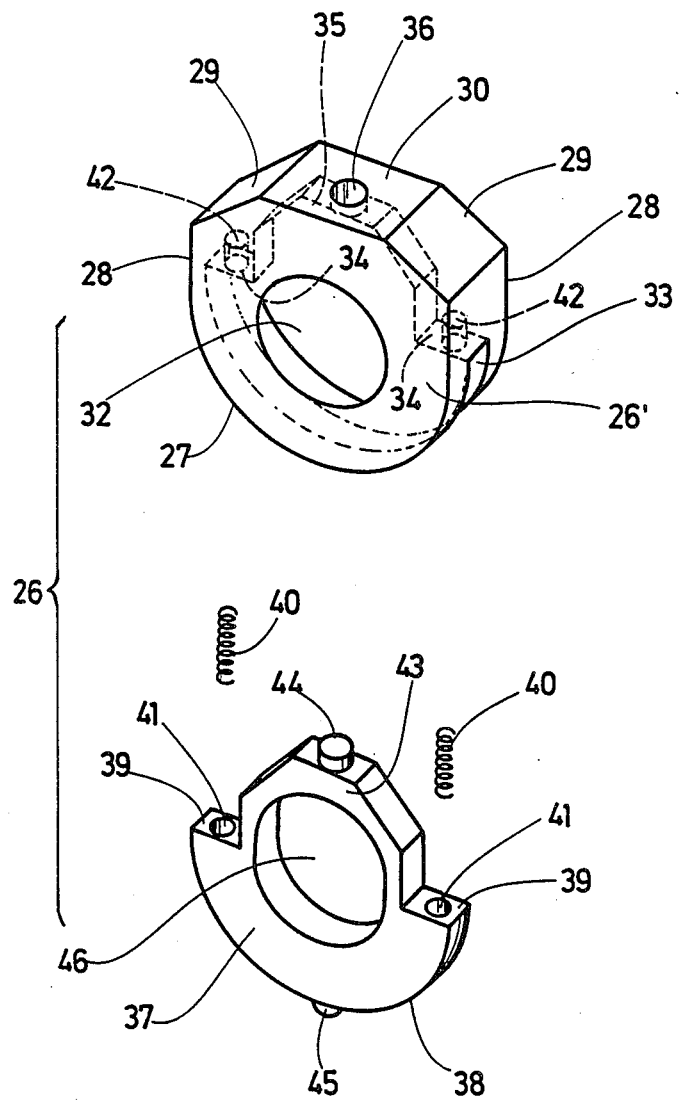
FIG. 11 is an exploded, perspective view of the support element of FIG. 1, to a different scale.

In accordance with a feature of the invention, the support elements, in cross section, have a shape which matches at least approximately the internal profile of the interior space 19 of the housing 1. FIG. 11 illustrates the support elements in detail. The support elements are essentially two-part structures. which each include a narrow support part 26 which has a lower, generally half-cylindrical portion 27. The radius of curvature of the lower portion 27 corresponds at least roughly to that of the semi-cylindrical part 24 of the inner wall of the housing 1. Two generally flat surface portions 28 then follow the essentially semil-cylindrical part 28 to which, looked upwardly from FIG. 11, two relatively inclined flat surface regions 29 are joined. The surface regions 29 form an angle of about 90° with respect to each other. The surface regions 29 do not extend to a tip or point but, rather, are cut off and joined by a flat surface 30. The inclined surfaces 29, when assembled in housing 1, can fit against the flat surface portions 25 of the housing 1 such that the support elements are longitudinally slidable along the inner wall of the housing, by sliding engagement of the surfaces 25 on the surfaces 29 of the support engagement of the surfaces 25 on the surfaces 29 of the support elements 26, without permitting rotation of the support elements about the longitudinal axis of the spindle, or of the housing, respectively. Flat surface portions 31 at the inner wall of the housing 19 match the flat surfaces 28 of the support elements 26. Each support element is formed with a central ring-shaped opening 32 which is large enough to fit, with some play, about the spindle 4, that is, is just slightly larger than the maximum diameter of the spindle 4.

In accordance with a feature of the invention, each one of the support elements 26 has a body 26' formed with a slot 33, starting from the essentially semi-cylindrical surface 27, and located in a plane of symmetry of the respective support element. The slot extends until about the center of the opening 32 in the body 26' and is extended by a recess which, roughly, matches in shape the outer shape of the surfaces 28, 29, 30, that is, the outer shape of the support element 26. A central bore 36 extends at the central axis through the body structure 26' of the support element 26 and into the slot 33.

An essentially ring-shaped slider 37 (FIG. 11) is fitted into the slot 33 and the recess 35 in the body portion 26' of the support element 26. The slide distance of the slider 37 is limited in longitudinal dimension. The slider 37 has an essentially semi-cylindrical lower portion 38, having a radius of curvature matching that of the semi-cylindrical surface portion 27 of the slider body 26'. Two parallel shoulders 39, located on a common diameter, and positioned parallel to shoulders 34 in the body 26', terminate the essentially semi-cylindrical portion 38. Blind bores 41 are formed in the shoulder portions 39 to receive compression springs 40 which, at the side opposite the slider, can be inserted into corresponding blind bores 42 of the body portion 26' of the support element 26. A guide portion 43 extends from the semi-cylindrical portion 38, and is shaped and dimensioned to fit into the recess 35 of the body part 26'. The upper end of the guide portion 43 terminates in a connecting dog or projection 44 which, when the slider 37 is assembled with the body portion 26', extends into and is fitted in the bore 36 of the body portion 26'. An engagement or snap-in button projection 45 is located diametrically opposite the connecting dog 44. Button 45 is essentially semi-spherical.

Slider 37 has a central opening 46 therein, which is an elongated through-hole, so made that the slider 37 can bove up and down within the body portion 26' of the support element, even when threaded on the spindle, and without, in any way, interfering with movement of the spindle, nor movement of the slider being interfered with by the presence of the spindle.

The interior or chamber 19 within the housing is formed with stops, in the embodiment shown with recesses 48 (FIGS. 1, 2) matching in shape the form of the engagement button or ball 45 on the slider 37 of the support elements 26. The recesses 48 form fixed stops along the support or housing or frame 1, and provide snap-in stop locations for the support elements 26 which hold the support elements 26 in predetermined, but releasable positions.

In accordance with a feature of the invention, the spindle nut is formed with two carrier arrangements, projecting from opposite sides thereof. The two carrier arrangements are identical. In accordance with the embodiment of FIG. 1, the carrier arrangements include take-up carrier strips 49 which are flat and are located in the longitudinal slit 7, and secured to the two trapezoidal portions or parts 9 of the carriage elements 8 of the force transfer element 6. Each one of the carrier strips or rails 49 are formed with a longitudinal groove 15 which is closed off at the side remote from the spindle nut 5 by an engagement shoulder 51. The length of the two carrier take-up strips or rails 49 is so dimensioned that they overlap all of the support elements 26 which are located at the respective side of the spindle nut 5, in other words, about the length of the combined width of all the support elements 26.

Figure 5:
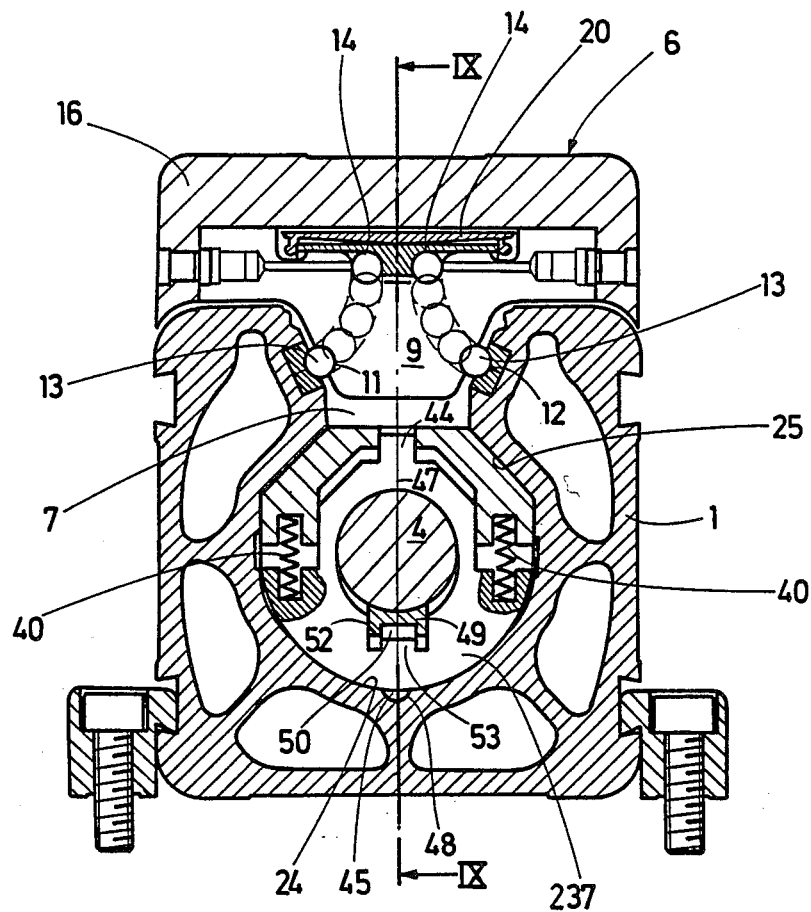
FIG. 5 is a section along line V—V of FIG. 2, to a different scale, and illustrating the support element in longitudinally locked position.
Figure 6:
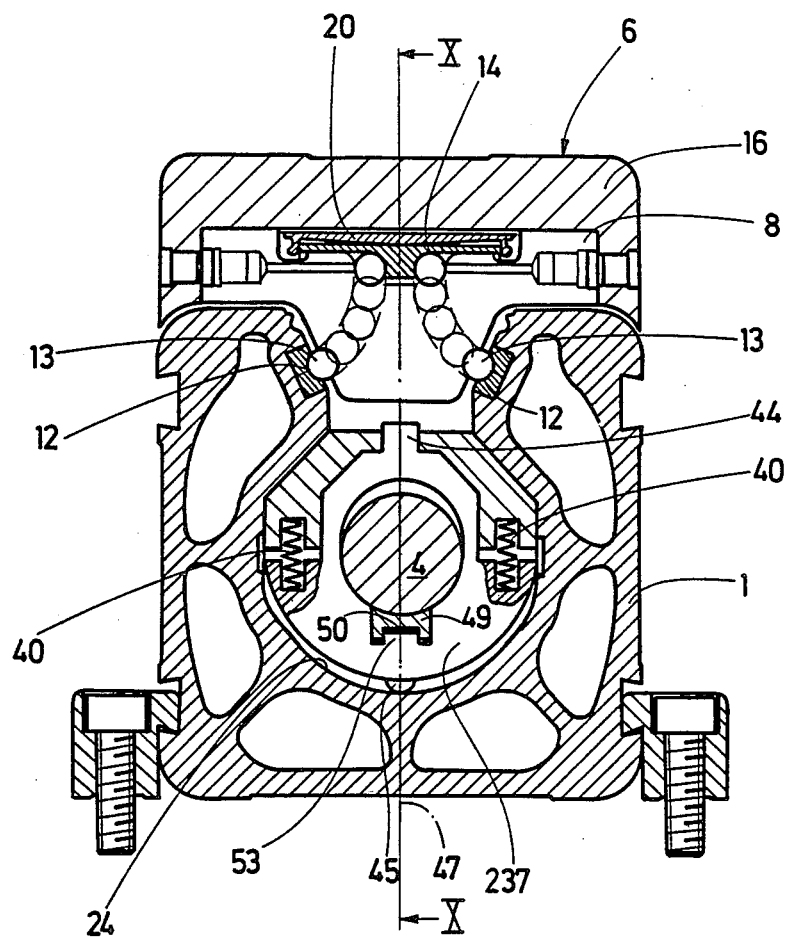
FIG. 6 is a view similar to FIG. 5 illustrating the support element in released position, and coupled to a take-up carrier on the spindle nut.

In accordance with the embodiment of FIGS. 2, 5 and 6, the parallel take-up carrier rails 49 are located below the spindle 4, and immediately adjacent thereto. They fit into a recess 52 formed in the support elements 226. The sliders 237, likewise, are formed with a similar opening. The take-up carrier rails 49 are coupled to the spindle nut 5 at the end faces thereof. The length of the take-up carrier rails 49 is so dimensioned that each one of the rails 49 can pass through all the collected support elements 226 at one side of the spindle nut. The longitudinal groove 50 of the rails 49 is closed off by an engagement shoulder similar to shoulder 51 and cooperates with a rectangular connecting dog 53 formed on the slider 237. The oppositely placed pin or extension 44 merely serves to guide the slilder 237 in its central operating plane; in this embodiment, it can be omitted and, likewise, the opening 36 in the body portion of the support element 226 need not be made.

Operation, and support of the spindle:

Let is be assumed that the spindle nut 5 is originally placed approximately in the middle of the spindle 4. Support elements 26, 226, respectively, three of which are shown in FIGS. 1 and 2 are inserted between the spindle nut 5 and the respective bearing flange 2 at the end of the housing or support structure 1. The number of support elements 26, 226 which will be used will depend on the design parameters of the longitudinal positioning apparatus. The respective support elements 26, 226, as described, have a cross-sectional profile which fits the shape or profile of the interior space 19 of the support or housing element 1, so that they are longitudinally slidable therein. At the same time, however, and due to the particular shape of the interior 19 of the housing, they are non-rotatable therein. The springs 40 press the sliders 37, 237, with respect to FIGS. 3, 4, 5, 6, downwardly, so that the sliders are biassed in engagement direction with respect to the stop depressions 48 to engage the buttons 45 therein, to for a resilient projection-recess engagement combination.

Figure 7:
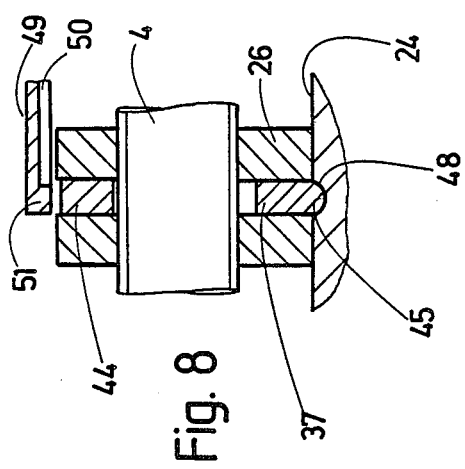
FIG. 7 is a fragmentary sectional side view along the line VII—VII of FIG. 3.
Figure 8:
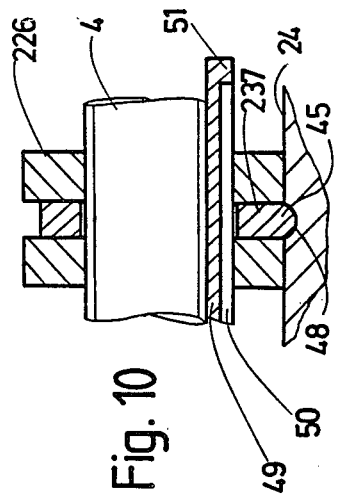
FIG. 8 is a fragmentary sectional side view along the line VIII—VIII of FIG. 4.
Figure 9:
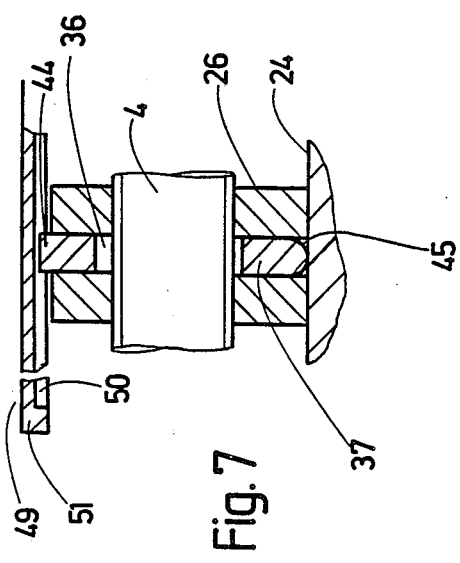
FIG. 9 is a fragmentary sectional side view of the support element taken along line IX—IX of FIG. 5.
Figure 10:
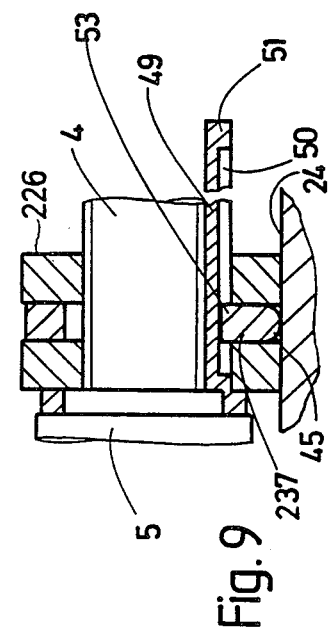
FIG. 10 is a fragmentary sectional side view taken along line X—X of FIG. 6.

As best seen in FIGS. 7 and 8 with respect to the embodiment of FIG. 1, and FIGS. 9 and 10 with respect to the embodiment of FIG. 2, the arrangement is so made that, when the engagement buttons 45 are lifted out of the recesses 48, the slider 37, 237 is moved counter the resilient bias of the springs 40 and so shifted with respect to the body portion 26' of the respective support element 26, 226 that, in accordance with FIG. 1, the movable connecting dog 44 engages the groove 50 of the carrier rail 49, if located above, or, in accordance with the embodiment of FIG. 2, the movable connection dog 53 engages in the groove 50 of the associated take-up or carrier rail 49, see FIG. 7 with respect to the embodiment of FIG. 1, and FIG. p with respect to the embodiment of FIG. 2.

When a respective support element 26, 226 is carried along so that the engagement button 45 on the respective slider 37, 237 drops into a recess 48 of the housing, under pressure of the springs 40, the slider is pushed downwardly and is engaged wityh its semi-cylindrical portion 38 on the semi-cylindrical surface 24 of the inner space 19 of the housing. In accordance with FIG. 1, the connecting dog 44, see FIG. 8, or in accordance with FIG. 2, the connecting dog 53, see FIG. 10, is released from the respective rail 49 and retracted into the body portion 26' of the respective support element 26, 226 so that it can no longer be ingaged by the end stop shoulder 51 of the rail 49, that is, the spindle nut with the rail and the end stop can freely slide thereover. The support element is, therefore, retained in the stop position defined by the recess 48 in the housing or support wall 1.

Let it be assumed that, starting from the position of FIG. 1, the spindle 4 is rotated to move the spindle nut 5 towards the right. The leading side of the spindle nut will be the right side, which then pushes the two support elements in advance of the leading face towards the right. The connecting dogs 44, upon being lifted out of the recesses 48, are engaged in the longitudinal groove 50 of the associated take-up carrier rail 49, that is, projecting from the right side of the spindle nut 5. The spindle nut can push the support element 6 by engagement with the face thereof towards the right.

When the two support elements 26, pushed forwardly by the spindle nut, reach the third spindle nut at the right, the third spindle nut is likewise pushed towards the right; the button 45, due to its semi-spherical shape, is resiliently released from the depression 48, pushing the slider 37 upwardly. The connecting dog 44, which previously was within the body 26' of the support element 26, and thus permitted the end 51 of the rail 50 to slide thereover, now is radially shifted upwardly and will engage in the longitudinal groove of the take-up carrier rail 49. The spindle nut 5 can continue its movement towards the right and collect further support elements 26 located in suitable positions along the length of the spindle. FIG. 1 shows the spindle highly compressed.

As the spindle moves towards the right, the left portion of the spindle will extend between the left end bearing 2 and the spindle nut. To support this now longer and longer portion of the spindle, support elements 26 previously collected against the face of the now trailing face of the spindle nut are positioned and deposited in suitable locations along the length of the housing. Initially, upon movement of the spindle nut to the right, support elements 26 are carried along by the shoulder 51 at the end of the groove 50 of the take-up carrier rails 49. The connecting dogs 44 were engaged in the groove 50 and the terminal one of the support elements 26 was engaged against the end stop 51 of the carrier rail.

Upon continued longitudinal movement towards the right of the spindle nut 5, the support element farthest at the left will, upon its travel towards the right, come in alignment with the depression 48 in the support 1, so that the button 45 on the slider 37 can slip into the depression 48, and interengage therewith. This downward movement also depresses the connecting dog 44 into its non-connecting position within the body 26' of the respective support element, so that its interengagement with the take-up carrier rail 49 is released. The end stop 51 from the rail 49 can now slide over the respective support element. The support element 26 remains, locked in position by interengagement of the button 45 with the depression 48 until, upon further movement to the right, the then next support element is released upon meeting the next depression 48, as described above.

Overall, therefore, as the region of the spindle between the spindle nut and the end flange edcreases, in FIG. 1 the right portion of the spindle, support elements 26 are continuously collected in front of the leading face of the spindle nut while, simultaneously, as the left portion of the spindle between the spindle nut 5 and the end of the structure increases, support elements 26 are left to support the spindle 4, spaced along the length of the support structure 1 by distances determined solely by the position of the respective depressions 48 in the support 1.

The system thus provides for reliable radial support of the spindle 4 in the region between the end flanges 2 and the spindle nut independent of the position of the spindle nut with respect to the end flanges.

Upon reversal of rotation of the spindle 4, collection and distribution of the support elements 26 will be similar to that previously described; the left side of the spindle nut will then become the leading side and the right side the trailing side.

The embodiment of FIG. 2 operates identically, so that a detailed further explanation is not necessary; the only difference is that, since the take-up carrier rails 49 are located below the spindle 4, the collected support elements 226 engage from beneath the spindle. This arrangement has the advantage of requiring less space since the support rail 49 can be placed into space which is available anyway, beneath the spindle 4, and does not require any additional space above the spindle nut and below the carriage or slider 6. This embodiment is particularly suitable for linear positioning elements in which the spindle is surrounded over longer portions thereof at all sides by a protective housing. If the support structure 1 is an open frame, better protection is afforded to the carrier rail 49 if the embodiment FIG. 1 is selected.

The sliders 37, 237 are particularly preferred embodiment for the projection-recess engagement with the housing or support structure 1 since they, simultaneously, can provide for engagement with the groove 50 in the respective take-up carrier rail 49. The sliders, being slidable transversely to the spindle 4, are readily movable to engage and disengage from the recesses 48, the connecting dog or element 44, 53 being part of the slider or controlled thereby. The slider, preferably, is a ring disk at least in part surrounding the spindle 4.

The stop positions are readily defined by the projection-and-recess arrangement formed on the slider 37, 237 and the recess 48 in the housing. The position may be reversed, however, and bumps can be formed on the housing. The arrangement as shown in FIGS. 1 and 2 is preferred however, since depressions in the housing or support structure 1 can be easily manufactured, for example by punching, drilling or boring, or milling a depression or small hole into which the button 45 can fit.

The take-up carrier in form of a rail or rod which has a collecting end shoulder 51 collects the support elements in advance of the leading end face of the spindle nut, and then releases and deposits the support elements upon reversal of the spindle nut, as the suport elements are pulled back by the end shoulder 51 and when the sliders, under spring pressure, snap into engagement with the semi-cyclindrical wall of the housing and the buttons 45 engage in the recesses 48. A groove or depressed track along the element 49, terminatred at the end by the stop 51, is a particularly simple, easily manufactured arrangement, permitting the respective dogs 44, 53 to engage in the groove and be carried along by the end stop or catch 51.

Various changes may be made, for example by separating the connecting dog from the slider or, and as preferred, making it unitary therewith.

In linear positioning apparatus, in which the force or power transfer element passes through a longitudinal slit in a housing, perferably is so constructed that the inner wall of the housing is shaped to form a guide track so that additional structural elements therefor can be saved. The take-up carrier rails or rods can then be located in the region of the longitudinal slit of the housing, since room therefor is available anyway. If the housing is of different construction, however, the embodiment of FIG. 2 may be desirable since a more compact positioning apparatus of lower cross-sectional dimension can thereby be provided. The support structure may, however, become somewhat more complex to provide for sufficient stiffness over long dimensions.

Rather than using rail elements for the take-up carriers 49, differently shaped structural units may be used, such as rods or the li,ke. The respective support elements and the connecting dogs then must be shaped to match the differently shaped take-up carriers.

In the embodiment described, the slider 37 carries a projecting dog 44 (FIG. 1) or a connectin dog 53 (FIG. 2). As a genneral principle, however, the arrangement can be so made that the slider 37 does not have projecting elements, and that, rather, the sliders themselves are used as connecting dogs or connecting structures. It is not necessary that the projection 44 fitted in the bore 36 of the respective support element 26 be unitary with the slider; separate coupling elements may be used, for example longitudinally slidable elements which are spring-loaded, and controlled to engage the groove or track 50 of the carrier rails 49, except when the respective support element is at a stop position.

Various changes and modifications may be made, and any features described herein may be used with any of the others, with in the scope of the inventive concept.

I claim:

1. Linear positioning apparatus having an elongated support (1);
    a spindle (4) extending parallel to said support and rotatably retained therreon, and a spindle nut (5) longitudinally slidably retained on the spindle and movable along the support in respectively opposite directions upon rotation of the spindle, said spindle nut defining oppositely located end portions facing the ends of the elongated support and forming, respectively, leading and trailing end portions, in dependence on the direction of movement of the spindle nutf
    at least one spindle support element for supporting the spindle between the ends of the support, and spaced therefrom,
    wherein
    each of the spindle support elements (26, 226) includes
    a body portion (26') and a movable, resiliently biassed engagement element (37, 45) projectable from the body portion;
    the support (1) is formed with at least one stop means (48) and positioned for engagement by the projectable engagement element (37, 45) of the spindle support element (26, 26') while being releasable from said engagement by axial movement of the leading end portion of the spindle nut (5) against the support element;
    a take-up carrier means (49, 50,51) is provided, located at an end portion of the spindle nut (5) for carrying along and moving the at least one released support element located at a trailing end portion of the spindle nut; and
    movable connecting dog means (44, 53) are provided, located on the least one support element (26, 226) engageable with said take-up carrier means (49, 50, 51) upon release of the projectable engagement element (37, 45) from the at least lone stop means while being disengaged from said take-up carrier means when said projectable engagement element engages with said stop means.

2. The apparatus of claim 1, wherein said connecting dog means (44, 53), upon engagement with the take-up carrier means (49, 50, 51), is coupled thereto for axial movement together with the spindle nut.

3. The apparatus of claim 1, wherein said take-up carrier means (49, 50, 51) comprises means defining a radial recess;
    and the carrier dog comprises a radially movable element (44, 53) engageable in said radial recess.

4. The apparatur of claim 3, wherein said movable resiliently biassed engagement element (37, 45, 237) controls movement of said connecting dog means (44, 53) for, respectively, engagement with said take-up carrier means or release therefrom.

5. The apparatus of claim 1, wherein the engagement element (37, 45, 237) comprises a slider, movably retained on the spindle support elements (26, 226) for sliding movement transversely to the spindle (4), said slider including means (45) engageable with said stop means and shifting the position of said slider upon engagement or disengagement with said stop means, 6. The apparatus of claim 5, wherein said slider controls the position of said connecting dog means (44, 53).

7. The apparatus of claim 5, wherein said slider and said connecting dog means comprises a unitary element (37, 237).

8. The apparatus of claim 5, wherein said slider (37, 237) is disk-shaped, with an opening therein through which said spindle (4) passes.

9. The apparatus of claim 1, wherein said stop means comprises recess means (48) formed in said support n1);
    and wherein said projectable engagement element includes a curved engagement projection, fitting, at least in part, in said recess.

10. The apparatus of claim 1, wherein said take-up carrier means (49, 50, 51) comprises an elongated rail or rod-like element exdtending from a respective end portion of the spindle nut for a distance at least approximately equal to the total thickness of all the support elements located between the respective end portion of the spindle nut and the end of the support (1).

11. The apparatus of claim 10, wherein the take-up carrier rail or rod (49) is formed with a longitudinal groove or recess (50) terminating in an end stop (51);
    and wherein the connecting dog means (44, 53) are dimensioned and shaped to fit into said elongated groove or recess upon release of the projectable engagement element (45) from the stop means (48) on the support.

12. The apparatus of claim 11, wherein the connecting dog means (44, 53) comprise a projecting pin or lug (44, 53) coupled to the projectable engagement element (37).

13. The apparatus of claim 1, wherein said elongated support (1) comprises a stiff essentially tubular elongated housing formed with a longitudinal slit (7);
    end closing flanges (2) closing off the housing, and supporting the spindle (4);
    a froce transfer element (6) passing through said slit;
    and wherein, in accordance with the invention, a portion of the inner wall of the housing (1) is formed as a guide path or guide track for a plurality of support elements (26, 226) within the housing.

14. The apparatus of claim 13, wherein the take-up carrier rail or rod (49) is formed with a longitudinal groove or recess (50) terminating in an end stop (51);
    wherein the connecting dog means (44, 53) are dimensioned and shaped to fit into said elongated groove or recess upon release of the projectable engagement element (45) from the stop means (48) on the supportf
    and wherein said take-up carrier or rod is positioned within the slit (7) of the housing (1).

15. The apparatus of claim 1, wherein said housing is an elongated stiff structure;

end flanges (2) located at respectively opposite sides of said structure and rotatably retaining said spindle (4) therein;

a force transfer element (6) coupled to the spindle nut and radially projecting from said spindle nut in a first direction; and wherein, in accordance with the invention, the take-up carrier means (49) is formed with a longitudinal groove or recess (50) terminating in an end stop (51);

wherein the connecting dog means (44, 53) are dimensioned and shaped to fit into said elongated groove or recess upon release of the projectable engagement element (45) from the stop means (48) on the support;

and wherein said take-up carrier means are located at a side of the spindle nut opposite said first direction.

16. Linear positioning apparatus having
an elongated support (1);
an elongated rod element (4) extending parallel to said support and retained thereon, and a take-off element (5) longitudinally slidably retained in the support (1) amd mpvabe along the support in respectively opposite directions upon sliding of the take-off element on the support, said take-off element defining an end portion facing an end of the elongated support and forming, respectively, leading and trailing end portions, in dependence on the direction of movement of the take-off element;
at least one rod support element (26) for supporting the rod between the ends of the support (1), and spaced therefrom,
wherein, in accordance with the invention,
each of the rod support elements (26) for supporting the rod between the ends of the support (1), and spaced therefrom,
wherein, in accordance with the invention,
each of the rod support elements (26, 226) includes
a body portion (26') and a movable, resiliently biassed engagement element (37, 45) projectable from the body portion;
the support (1) is formed with at least one stop means (48) and positioned for engagement by the projectable engagement element (37, 45) of the rod support element (26, 26') while being releasable from said engagement by axial movement of the leading end portion of the take-off element (5) against the support element;
a take-up carrier (49, 50, 51) is provided, located at an end portion of the take-off element (5) for carrying along and moving the at least one released support element located at a trailing end portion of the take-off element; and
moveable connecting dog means (44, 53) are provided, located on the at least one support element (26, 226) engageable with said take-up carrier means (49, 50, 51) upon release of the projectable engagement element (37, 45) from the at least one stop means while being disengaged from said take-up carrier means when said projectable engagement element engages with sais stop means.

17. The apparatus of claim 16, wherein said connecting dog means (44, 53), upon engagement with the take-up carrier means (49, 50, 51), is coupled thereto for axial movement together with the spindle nut.

18. The apparatus of claim 16, wherein said take-up carrier means (49, 50, 51) comprises means defining a radial recessf
and the carrier dog comprises a radially movable element (44, 53) engageable in said radial recess.

19. The apparatus of claim 18, wherein said moveable resiliently biassed engagement element (37, 45, 237) controls movement of said connecting dog means (44, 53) for, respectively, engagement with said take-up carrier means or release therefor.

* * * * *